(12) United States Patent
Kumar

(10) Patent No.: US 8,453,731 B2
(45) Date of Patent: Jun. 4, 2013

(54) APPARATUS AND METHOD FOR ESTIMATING FORMATION PROPERTIES USING NANOEXPLOSIVE ELEMENTS

(75) Inventor: Sunil Kumar, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 73 days.

(21) Appl. No.: 12/869,315

(22) Filed: Aug. 26, 2010

(65) Prior Publication Data

US 2012/0048558 A1 Mar. 1, 2012

(51) Int. Cl.
*E21B 49/00* (2006.01)
(52) U.S. Cl.
USPC .................................................... 166/250.1
(58) Field of Classification Search
USPC .................. 166/250.08; 155/250.1
See application file for complete search history.

(56) References Cited

U.S. PATENT DOCUMENTS

| | | | | |
|---|---|---|---|---|
| 4,031,826 | A * | 6/1977 | Gemmell et al. | 367/81 |
| 7,681,653 | B2 * | 3/2010 | Korte et al. | 166/387 |
| 2004/0226715 | A1 * | 11/2004 | Willberg et al. | 166/250.1 |
| 2009/0211754 | A1 * | 8/2009 | Verret et al. | 166/250.12 |
| 2010/0126717 | A1 * | 5/2010 | Kuchuk et al. | 166/250.03 |
| 2010/0242586 | A1 * | 9/2010 | Elshahawi et al. | 73/152.39 |

OTHER PUBLICATIONS

Balasubramanian et al., "Thermal Modulation of Nanomotor Movement," small, 2009, vol. 5, No. 13, pp. 1569-1574.

J. Burdick et al., "Synthetic Nanomotors in Microchannel Networks: Directional Microchip Motion and Controlled Manipulation of Cargo," JACS Communications, J. Am. Chem. Soc. 2008, 130, pp. 8164-8165.

P. Calvo-Marzal et al., "Electrochemically-triggered motion of catalytic nanometers," Communication, Chem. Commun., 2009, pp. 4509-4511.

Demirok et al., "Ultrafast Catalytic Alloy Nanomotors, Nanotechnology," Angew. Chem. Int. Ed, 2008, pp. 9349-9351.

Kline et al., "Catalytic Nanomotors: Remote-Controlled Autonomous Movement of Striped Metallic Nanorods," Communications, Angew. Chem. Int. Ed., 2005, 44, pp. 744-746.

Laocharoensuk et al., "Carbon-Nanotube-Induced Acceleration of Catalytic Nanomotors," ACS NANO, vol. 2, No. 5, 2008, pp. 1069-1075.

Mallouk et al., "Catalytic engines enable tiny swimmers to harness fuel from their environment and overcome the weird physics of the microscopic world," Scientific American Magazine, May 6, 2009, 4 sheets.

Wang, "Can Man-Made Nanomachines Compete with Nature Biomotors?," ACS NANO, vol. 3, No. 1, 2009, pp. 4-9.

Zhang et al., "Artificial bacterial flagella: Fabrication and magnetic control," Applied Physics Letters, 94, American Institute of Physics, 2009, pp. 064107-1-064107-3.

Zhang et al., "Characterizing the Swimming Properties of Artificial Bacterial Flagella," Nano Letters, XXXX American Chemical Society, pp. A-E.

* cited by examiner

*Primary Examiner* — William P Neuder
*Assistant Examiner* — Kipp Wallace
(74) *Attorney, Agent, or Firm* — Cantor Colburn LLP

(57) ABSTRACT

In one aspect a method of estimating a property of interest of a formation is provided, which method in one embodiment may include: injecting nanoexplosive elements into the formation, detecting signals responsive to explosion of the nanoexplosive elements by one or more sensors, and processing the detected signals by a processor to estimate the property of interest of the formation.

17 Claims, 4 Drawing Sheets

APPARATUS AND METHOD FOR ESTIMATING FORMATION PROPERTIES USING NANOEXPLOSIVE ELEMENTS

BACKGROUND

1. Field of the Disclosure

This disclosure relates generally to estimating formation properties using explosive elements.

2. Brief Description of the Related Art

Oil wells (wellbores or boreholes) are drilled with a drill string that includes a tubular member having a drilling assembly (also referred to as the bottomhole assembly or "BHA") with a drill bit attached to the bottom end thereof. The drill bit is rotated to disintegrate the earth formations to drill the wellbore. The BHA includes devices and sensors for providing information about a variety of parameters relating to the drilling operations and the formation. Various sensors (referred to measurement-while-drilling sensors or logging-while-drilling sensors or tools) are typically placed in the drilling assembly to determine properties of the formation while drilling the wellbore. Logging tools using different sensors are used to provide information about the formation after drilling. The oil service industry is continually searching for ways to estimate various properties of the formation using different and more efficient and economical technologies.

The disclosure herein provides apparatus and methods for using certain explosive elements in the formation to estimate one or more properties of formation using acoustic signals generated by such explosive elements in the formation.

SUMMARY

In one aspect a method of estimating a property of interest of a formation is provided. The method in one embodiment may include injecting explosive elements into the formation, detecting acoustic signals responsive to the explosion of the explosive elements in the formation by one or more sensors and processing the detected acoustic signals by a processor to estimate the property of interest of the formation.

In another aspect, an apparatus for use downhole is provided that in one embodiment may include an injection device configured to inject explosive elements into a formation, a sensor configured to detect acoustic signals generated by the explosion of the explosive elements in the formation and a processor configured to process the detected acoustic signals to estimate a property of the formation.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

Figure 1:
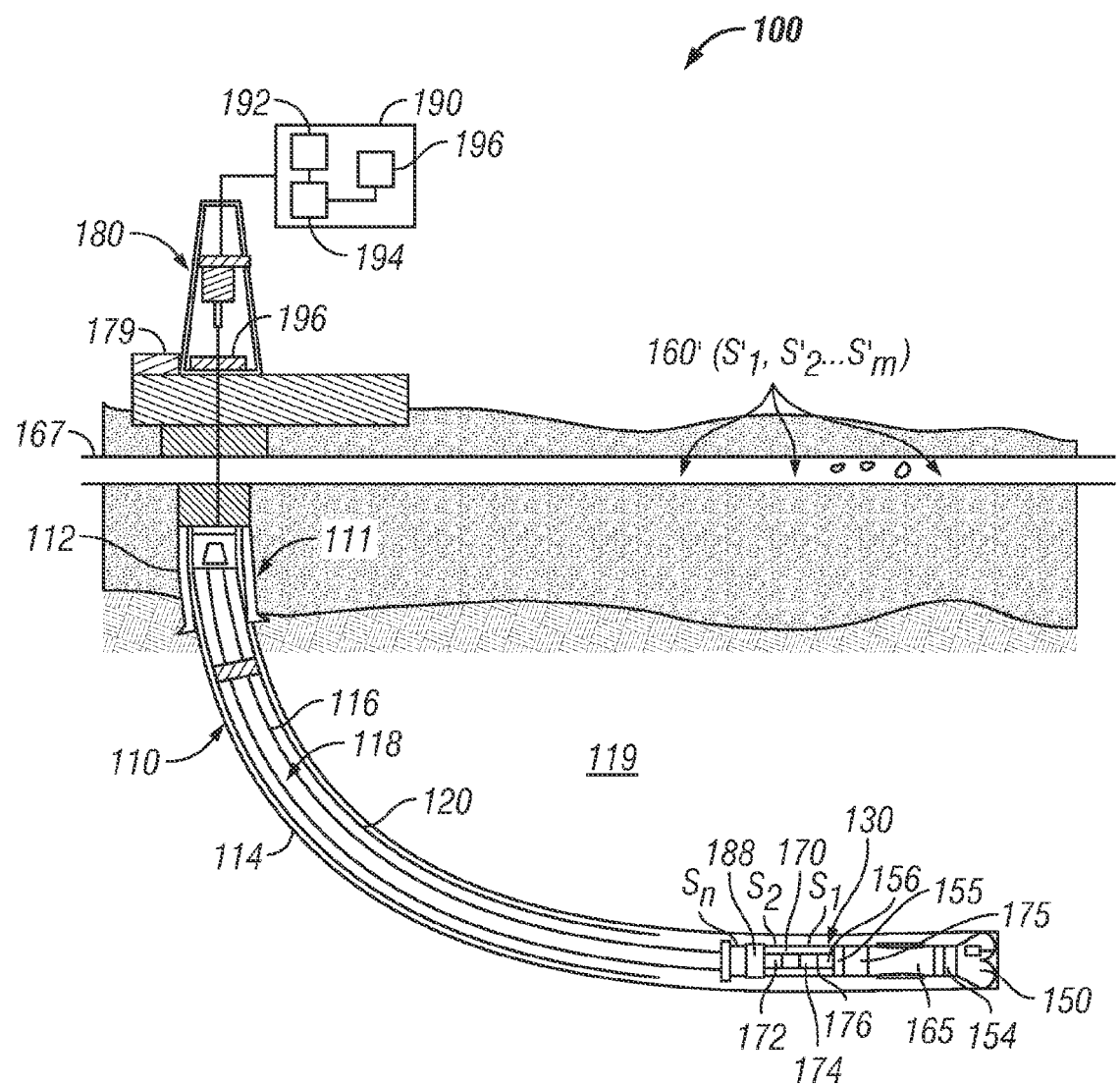
FIG. 1 is a schematic diagram of an exemplary system configured to carry a apparatus in a wellbore, wherein the apparatus is configured to inject certain explosive elements into a formation and to estimate a property of the formation utilizing acoustic signals produced by such explosive elements in the formation, according to one embodiment of the disclosure.

FIG. 1 is a schematic diagram of an exemplary drilling system 100 that may utilize apparatus for injecting certain explosive elements into a formation and further estimate one or more properties of the formation utilizing acoustic energy or signals produced by the explosive elements in the formation, according to the various embodiments and methods of this disclosure. FIG. 1 shows a wellbore 110 that includes an upper section 111 with a casing 112 installed therein and a lower section 114 being drilled with a drill string 118. The drill string 118 includes a tubular member 116 that carries a drilling assembly 130 (also referred to as the bottomhole assembly or "BHA") at its bottom end. The tubular member 116 may be made up by joining drill pipe sections or a coiled-tubing. A drill bit 150 is attached to the bottom end of the BHA 130 for disintegrating the rock formation to drill the wellbore 110 of a selected diameter in the formation 119. The terms wellbore and borehole are used herein as synonyms.

The drill string 118 is shown conveyed into the wellbore 110 from an exemplary rig 180 at the surface 167. The rig 180 shown in FIG. 1 is a land rig for ease of explanation. The apparatus and methods disclosed herein may also be utilized with offshore rigs. A rotary table 169 or a top drive (not shown) coupled to the drill string 118 may be utilized to rotate the drill string 118 at the surface to rotate the drilling assembly 130 and thus the drill bit 150 to drill the wellbore 110. A drilling motor 155 (also referred to as "mud motor") may also be provided to rotate the drill bit. A control unit (or controller or surface controller) 190 that may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, a data storage device (or a computer-readable medium) 194 for storing data and computer programs 196. The data storage device 194 may be any suitable device, including, but not limited to, a read-only memory (ROM), a random-access memory (RAM), a flash memory, a magnetic tape, a hard disc and an optical disk. To drill wellbore 110, a drilling fluid 179 is pumped under pressure into the tubular member 116. The drilling fluid discharges at the bottom of the drill bit 150 and returns to the surface via the annular space (also referred as the "annulus") between the drill string 118 and the inside wall of the wellbore 110.

Still referring to FIG. 1, the drilling assembly 130 may further include one or more downhole sensors (also referred to as the measurement-while-drilling (MWD) or logging-while-drilling (LWD) sensors, collectively designated by numeral 175, and at least one control unit (or controller) 170 for processing data received from the MWD sensors 175 and the drill bit 150. The controller 170 may include a processor 172, such as a microprocessor, a data storage device 174 and a program 176 for use by the processor to process downhole data and to communicate data with the surface controller 190 via a two-way telemetry unit 188. The data storage device may be any suitable memory device, including, but not limited to, a read-only memory (ROM), random access memory (RAM), flash memory and disk. The BHA 130 also includes a tool 165 configured to inject relatively small explosive elements, such as explosives having dimensions in a few micrometer or nanometer range. Other explosive elements may also be utilized for the purpose of this disclosure. Accordingly, the drill string 118 or a portion thereof (such as the BHA) may include a source or transmitter 156 for activating the active nanoexplosive elements and one or more sensors S1, S2 ... Sn, etc. (collectively designated by numeral 160) configured to detect acoustic signals generated by the nanoexplosive elements. Additionally, sensors S1', S2' ... Sm' (collectively designated by numeral 160') may be placed at selected location at the surface for detecting acoustic signals generated by the explosive elements. The sensors 160 may be any suitable sensors, such a high resolution hydrophones. The sensors 160', in one aspect, may be placed in the earth surface. Such sensors may be high resolution geophones or any other suitable sensors configured to detect acoustic signals. The detected acoustic signal may be processed by the downhole controller 170 and/or the surface controller 190 to estimate one or more properties of the formation, as described in more detail in reference to FIGS. 2-4.

For the purpose of this disclosure, small explosive elements may be referred to as nanoexplosive elements. The nanoexplosive elements may be (i) passive elements, i.e., elements that explode a certain time period after they are placed or injected at a selected location (explosive elements having an inherent or specifically configured time delay), such as, for example, explosive elements that will explode in a formation after a predetermined time or after a certain travelled distance; or (ii) passive elements that explode when they come in contact with a specific material in the formation; or (iii) active elements, i.e., elements that may be activated by an external stimulus to explode, including, but not limited to, the elements configured to explode by magnetic signals, electrical signals and radio signals.

In aspects, synthetic (man-made) nanoscale motors may be utilized to transport the nanoexplosive elements into the formation. Certain synthetic nanomotors are capable of converting energy into movement and forces. Such synthetic nanomotors can tolerate a more diverse range of environmental conditions, such as high temperatures and pressures in formation. Some current nanomotors can travel at velocities of 100 body lengths per second and generate relatively large forces capable of moving or dragging cargo more that ten times their own diameter. Nanomotors including nanowires display autonomous movement (self-propelled) in the axial direction of the wire with speeds of about 20 micrometer/sec. By tailoring the self-propelled nanowire motors or fuel composition, the force (power) and speed of such nanowire motors can be increase to over 100 um/sec, i.e. 50 body lengths or more. Also, nanomotors may be transported inside the formation under high pressure and temperature. Also, the motion of certain synthetic nanomotors carrying cargo (such as nanoexplosive elements) within the microchannel networks of a formation may be manipulated by external forces, such as magnetic forces. Such synthetic nanomotors may be employed to carry nanoexplosive elements into the formation. The nanoexplosive elements carried by the nanomotors may be passive materials or active materials. In one configuration, the self-propelled nanomotors can deliver nanoexplosive elements to remote locations in the formation by utilizing the locally available hydrocarbons to propel themselves deeper into the interconnected pores of the formation rock matrix. Nanomotors carrying small explosive elements may be setoff after a predetermined time or by an external stimulus, such as radio frequency signals, magnetic signals, etc., producing micro-seismic explosion events. The acoustic signals produced by such micro-seismic explosion events may be detected by seismic sensors in a wellbore and/or at the surface and processed to estimate one or more properties of the formation, including providing images of mud invasion of the formation and other formation properties.

Figure 2:
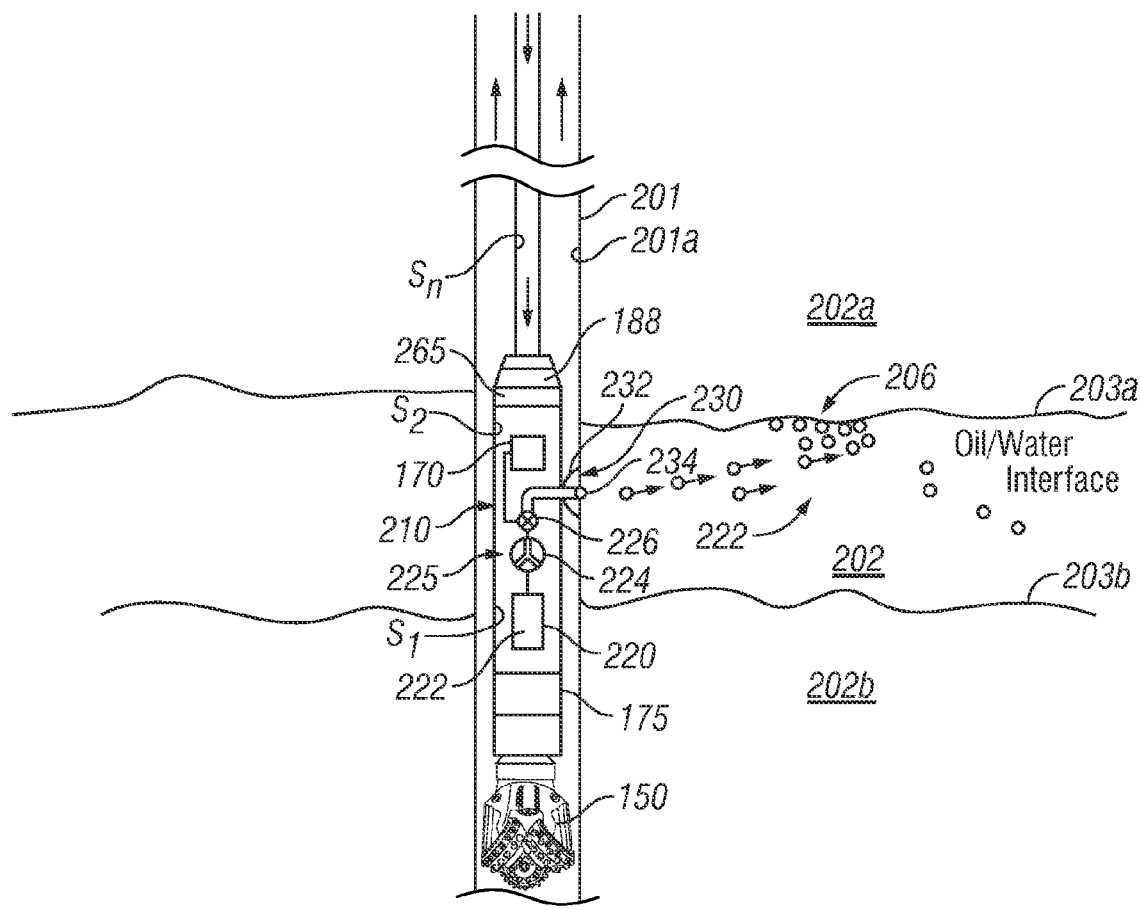
FIG. 2 shows details of a tool placed in a wellbore and configured to inject certain explosive elements into a formation and to estimate a property of the formation utilizing acoustic signals produced by such explosive elements, according to one embodiment of the disclosure.

FIG. 2 shows details of an exemplary tool 210 placed at a selected location in wellbore 201 proximate a zone of interest 202. The zone 202 is shown to include an upper boundary interface 203a corresponding to an upper zone 202a and a lower boundary interface 203b corresponding to a lower zone 202b. The tool 210, in one aspect, includes a container 220 configured to store explosive elements 222 for use downhole. The tool 210 includes a pumping unit 225 configured to inject explosive elements 222 from the container 220 into the zone 202. In one configuration, the pumping unit 225 includes a pump 224 coupled to an extendable probe 230 enclosed in a pad 234 and a flow control device 226, including, but not limited to, an electrically-controlled valve, a mechanically-controlled valve or a hydraulically-controlled valve. The flow control device 226 and the pump 224 may be controlled by the downhole controller 170 and/or the surface controller 190 (FIG. 1).

Still referring to FIGS. 1 and 2, once the tool 210 is located at the desired depth, the probe 230 and pad 234 are extended to cause the pad 234 to seal against the inside wall 201a of the wellbore 201, which causes the probe 230 to abut the wall 201a. Once the probe 230 is firmly in position, the pump 224 is activated and the valve 226 opened to a selected position to inject the explosive elements 222 into the formation 202. In one aspect, the explosive elements 222 move over time toward the interface 203a. In one aspect, the interface 203a may be an oil-water interface. In one aspect, explosive elements 222 are passive elements having substantially the same characteristics or properties. In such a case, the explosive elements 222 will have substantially the same time constant, i.e., that they will explode at about the same time from the time of injection. Also, such explosive elements 222 will tend to move at substantially the same speed along the same path in the zone 202 and thus will travel to substantially the same location 206 and explode substantially simultaneously. When active explosive elements are utilized, such elements will travel in the formation 202 a certain distance per unit time. In the case of active explosive elements, a suitable activation device 265 may be used to activate the active explosive elements at a desired time after the time of injection of such elements into the formation 202. The source may be any suitable source based on the type of nanoexplosive elements used, including, but not limited to, an acoustic source, a radio frequency source, a magnetic source and a thermal (heat) source. The timing of activation of activate explosive elements may be estimated or calculated based on the type of elements used and the downhole conditions, such as, but not limited to, the types of fluid in the formation, thermal conditions and pressure. Sensors S1, S2 ... Sn along the tool 210 and the drill string 218 detect the acoustic signals produced by the explosions of the explosive elements 222 in the formation. Alternatively or in addition to, sensors S1', S2' . . . Sm' at the surface may be utilized to detect the acoustic signals produced by the explosions of the explosive elements 222. The detected acoustic signals may be amplified, conditioned and processed by the downhole control unit 170 and/or the surface control unit 190 to provide estimates of one or more properties of the formation. In another aspect, the nanoexplosive element may be injected at any selected depth and controllable exploded to fracture rock formation at such depth. The timing of such controlled explosion or explosions will depend on the travel time of such nanoexplosive elements to reach the desired fracture location or locations.

Figure 3:
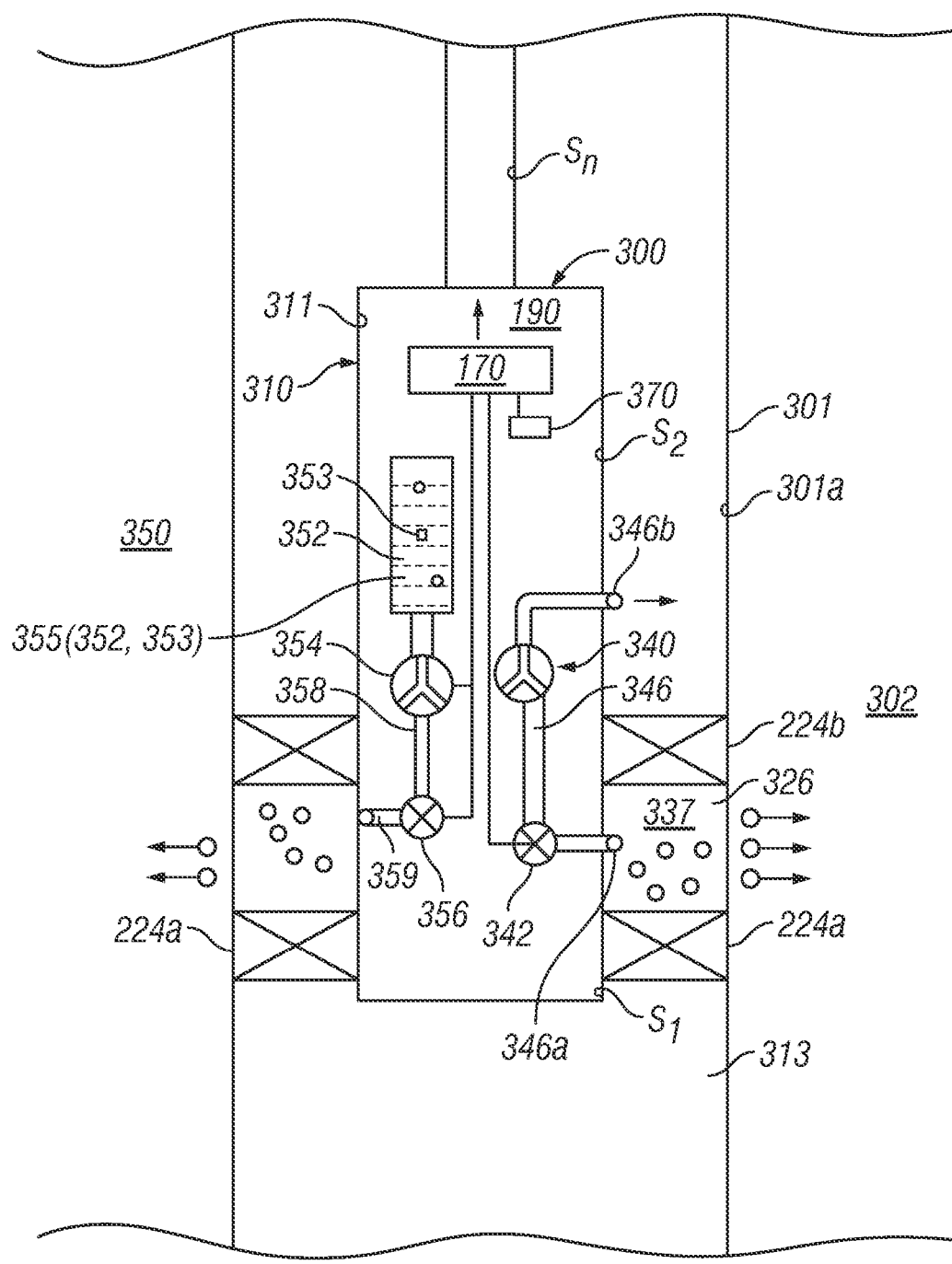
FIG. 3 is line diagram of a tool placed in a wellbore and configured to inject certain explosive elements into a formation and to estimate a property of the formation utilizing acoustic signals produced by such explosive elements in the formation, according to another embodiment of the disclosure.

FIG. 3 is line diagram of an apparatus 300 configured to inject explosive elements into a formation and to estimate one or more properties of the formation utilizing acoustic signals produced by the explosion of such explosive elements 222 in the formation, according to another embodiment of the disclosure. The apparatus 300 is shown deployed in a wellbore 301. The apparatus 300 includes a tool 310 having a body 311 that houses a pair of spaced-apart sealing members 224a and 224b configured to seal a section 326 of the wellbore 301 between the sealing elements 324a and 324b. In aspects, the sealing elements 324a and 324b may be: expanded from the tool body 311 to form a seal with the inside wall 301a of the wellbore 301 to anchor the tool 310 in the wellbore and to isolate the wellbore section 326; and retracted to allow the tool 310 to move freely in the wellbore 301. The tool 310 further may include a pumping device 340 that includes a pump 341 and a flow control device 342, such as a valve in a conduit 346. The conduit 346 includes an inlet 346a in fluid communication with isolated section 326 and an outlet 346b in fluid communication with the wellbore section above the sealing device 324b. The pump 341 and the flow control device 342 may be controlled by the downhole controller 170 and or the surface controller 190, as discussed earlier. The tool 310 further includes a container 350 for storing a mixture 355 containing a suitable fluid 352 and explosive element 353. The mixture 355 is referred to as the explosive elements containing fluid. A pump 354 and flow control device 356 coupled to a flow line 358 and the pump 354 are configured to pump the explosive elements containing fluid 355 from the container 350 into the sealed section 336 via a nozzle 359 at the end of the flow line 358.

Still referring to FIG. 3, after placing the tool 310 at the desired location or depth in the wellbore 301, the sealing elements 324a and 324b are expanded to isolate the section 336 of the wellbore 301. The controller 170 opens the flow control device 342 and activates the pump 341 thereby removing the fluid 337 from the isolated section 336 and pumping it into the annular space 339 between the tool 310 and the wellbore wall 301 above the sealing element 324b. Once a desired volume of the fluid 337 has been removed from the section 336, the flow control device 342 is closed and pump 341 deactivated. The flow control device 356 is then opened and the pump 354 activated to pump the explosive elements containing fluid 355 from the storage device 350 into the section 336. The pressure on the explosive elements containing fluid 355 in the section 336 may be increased by the pump 354 or another device, such as a hydraulically or mechanically-operated plunger to cause the fluid 355 in the section 336 to migrate into the formation 302. When the explosive elements 353 in the fluid 355 are passive elements, they will explode a certain time after they migrate into the formation 302 as described in reference to FIG. 2. If the explosive elements 353 in the fluid 355 are active elements, they may be exploded by an activation device 370. The acoustic signals generated by the explosive elements 353 are detected by the sensors S1, S2 . . . Sn. The signals from such sensors may be amplified, conditioned and processed by the controller 170 and/or controller 190 to estimate one or more properties of the formation, in the manner described above in reference to FIGS. 1 and 2. In another aspect, the distance between the sealing members 324a and 324b may be made sufficiently small, thereby eliminating the need to remove any fluid from the section 336. In such a case, the tool 310 need not include pumping unit 340.

Figure 4:
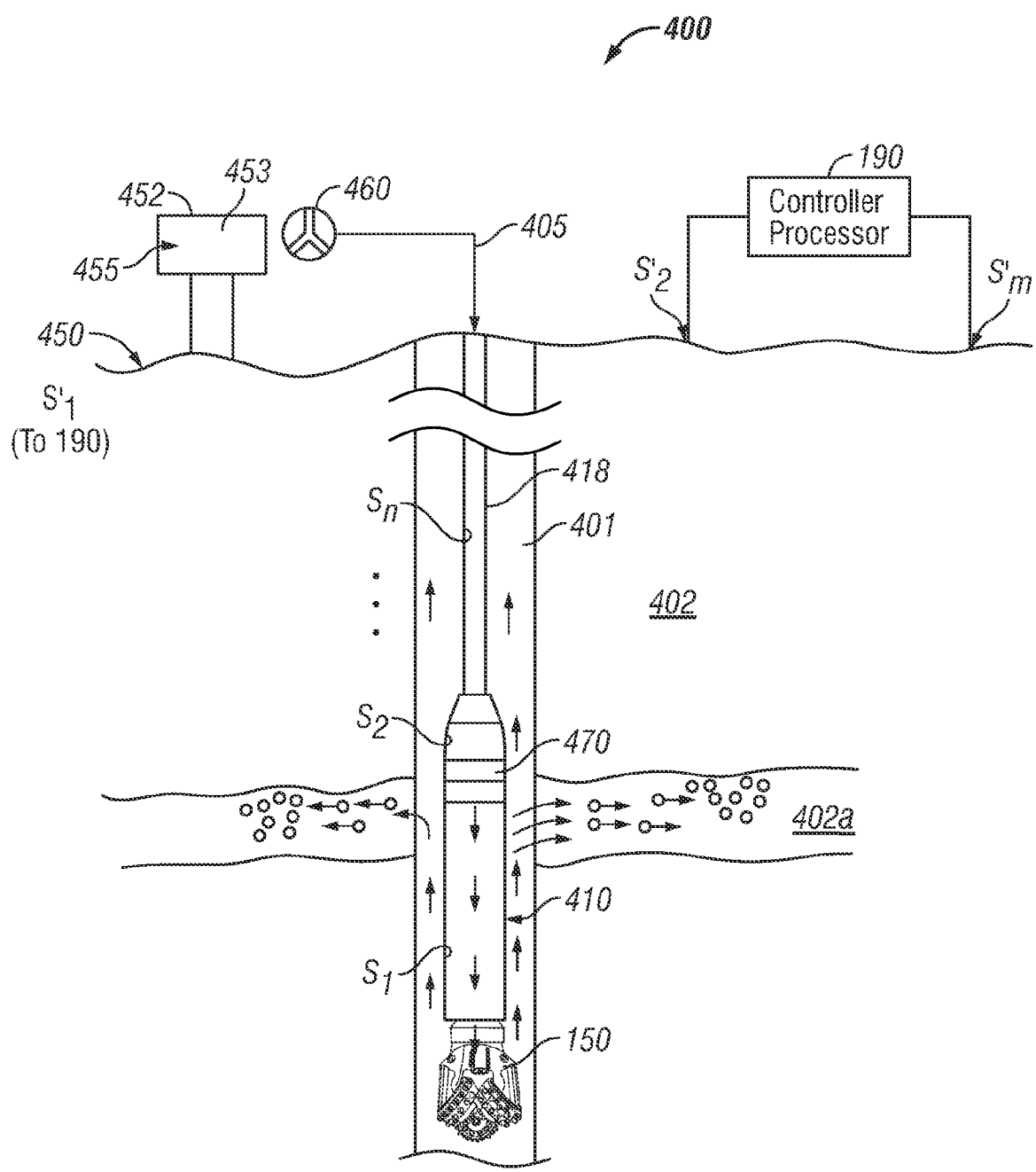
FIG. 4 shows an apparatus for using explosive elements to determine a zone that is absorbing drilling fluid (also referred to as a thief zone) during drilling of a wellbore.

FIG. 4 shows an apparatus 400 for using explosive elements to determine a zone that is absorbing excessive amounts of the drilling fluid (also referred to as a thief zone) during drilling of a wellbore 401. During normal formation condition, a certain amount of the drilling fluid 405 penetrates into the formation surrounding the wellbore 402 and is thus lost. The zone in which the drilling fluid penetrates is referred to as the invaded zone. Such amounts are generally known to the operators. However, excessive amount of the drilling fluid penetrates in poorly consolidated rocks (thief zones). When the existence of a thief zone, such as zone 402a, is suspected, a pump 460 at the surface may be utilized to pump a fluid mixture 455 containing the drilling fluid 452 and explosive elements 453 into the drilling tubular 418. The mixture 455 will penetrate into the thief zone 402a. If the explosive elements 353 are passive elements, they will explode after a time period and if they are active elements, they may be exploded by an activation device 470. The acoustic signals generated by the explosive elements 353 may be detected by sensors S1, S2 . . . Sn and processed by the controller 170 and/or controller 190 as described in reference to FIGS. 1 and 2.

In each of the embodiments described herein, the acoustic signals generated by the nanoexplosive elements may be utilized to estimate certain properties of the formation, including, but not limited to, location of the explosions, a bed boundary condition, a distance between location of an explosion and a reference location, and an image of a property of the formation. Also, magnetic and dielectric particles mixed with the drilling fluid may be injected into the formation. Magnetic and electric measurements of the magnetic and electrical particles infiltrated into the formation may be utilized to map the invaded zone, including a thief zone. The mapping of such a zone may be presented in a two-dimensional or three-dimensional viewgraph corresponding to any desired wellbore depth. Such mapping may be accomplished while drilling the wellbore.

Thus, in one aspect, a method of estimating a property of a formation is disclosed, which method in one embodiment may include: injecting nanoexplosive elements into the formation; detecting signals responsive to explosion of the nanoexplosive elements by one or more sensors; and processing the detected signals by a processor to estimate the property of interest of the formation. In aspects, the nanoexplosive elements may be: (i) passive nanoexplosive elements that explode when they come in contact with a selected element; (ii) active elements configured to be exploded by a remote controller; or (iii) nanoexplosive elements carried by nanocarrier that migrate into the formation. In one aspect, the nanoexplosive elements may be injected by a pump located in the wellbore, which pump is configured to pump the nanoexplosive elements from a source thereof through a probe placed against a wall of the wellbore. In another aspect, the method may include: (i) replacing a fluid in a section of the wellbore with a fluid containing nanoexplosive elements; and (ii) pressurizing the fluid containing the nanoexplosive elements in the section of the wellbore to cause the nanoexplosive elements to migrate into the formation. The one or more sensors include at least one sensor at a location selected from one of: (i) a location a wellbore formed in the formation; (ii) a location at the surface; and (iii) at least one sensor in the wellbore formed in the formation and at least one sensor at the surface. In another aspect, the method may utilize at least three spaced-apart sensors; and process the signals by applying a triangulation technique to determine a location associated with the explosion of the nanoexplosive elements. The nanoexplosive elements, when utilized, may be exploded by any suitable source or mechanism, including, but not limited to: a radio frequency source (signals), a magnetic source (signals), an acoustic source (signals); and a thermal (heat) source.

In yet another aspect, a method of estimating a location of a thief zone is provided, which method, in one embodiment, may include: drilling a wellbore using a drilling fluid; determining a condition of an invasion of the drilling fluid into the formation; supplying nanoexplosive elements to the drilling fluid; detecting acoustic signals generated by explosion of the explosive elements in the formation by one or more sensors; and processing the detected signals by a processor to determine location of the zone associated with the invasion of the drilling fluid into the formation. In one configuration, the explosive elements are active elements that may be exploded using radio frequency or magnetic signals.

In another aspect, an apparatus for use in a wellbore is provided, which apparatus, in one embodiment, includes: an injection device configured to inject nanoexplosive elements into a formation; one or more sensors configured to detect acoustic signals generated by explosion of the nanoexplosive elements in the formation; and a processor configured to process the signals from the one or more sensors to estimate a property of the formation. In one configuration, the injection device includes a pump configured to pump the nanoexplosive elements from a source thereof into the formation. In one aspect, the nanoexplosive elements are active elements and the apparatus further comprises an actuation device to activate the active nanoexplosive elements. The nanoexplosive elements may comprise one of: (i) passive nanoexplosive elements that explode when they come in contact with a selected element; (ii) active elements configured to be exploded by a remote controller; and (iii) nanoexplosive elements carried by nano-carriers that migrate into the formation. In another configuration, the apparatus may further include: (i) a sealing device configured to isolate a section of the wellbore; (ii) a device configured to remove fluid from the isolated section; and wherein the injection device is configured to inject the nanoexplosive elements into the isolated space. In one aspect, the apparatus includes at least three spaced apart sensors, and wherein the processor is configured to utilize a triangulation technique to estimate a location of the explosion of the nanoexplosive elements in the formation. In one aspect, the actuation device is one of: (i) a radio frequency source; and (ii) a magnetic source.

In yet another aspect, an apparatus for estimating a property of a formation, the apparatus includes a drill string configured for drilling a wellbore; a pump configured to supply a drilling fluid to the drill string during drilling of the wellbore; a device for supplying nanoexplosive elements, wherein the nanoexplosive elements are configured to migrate into the formation and explode; at least one sensor configured to detect acoustic signals generated by the explosion of the nanoexplosive elements in the formation; and a processor configured to process the signals from the at least one sensor to estimate the property of the formation. In one configuration, the explosive elements are active elements, and the apparatus further comprises a source to cause the active nanoexplosive elements to explode.

The foregoing description is directed to certain embodiments for the purpose of illustration and explanation. It will be apparent, however, to persons skilled in the art, that many modifications and changes to the embodiments set forth above may be made without departing from the scope and spirit of the concepts and embodiments disclosed herein. It is intended that the following claims be interpreted to embrace all such modifications and changes.

The invention claimed is:

1. A method of estimating a property of interest of a formation, comprising:
   conveying an apparatus into a wellbore, the apparatus carrying nanoexplosive elements and a device configured to inject the nanoexplosive elements into a formation surrounding the wellbore;
   injecting the nanoexplosive elements into a zone of interest of the formation from the device;
   detonating the nanoexplosive elements, the nanoexplosive elements themselves being responsive to one of magnetic signals and radio signals to cause the detonating;
   detecting signals responsive to explosion of the nanoexplosive elements in the zone of interest by one or more sensors; and
   processing the detected signals by a processor to estimate the property of interest of the formation.

2. The method of claim 1, wherein the nanoexplosive elements comprise one of: (i) active nanoexplosive elements configured to be exploded by a remote device; (ii) nanoexplosive elements carried by a nano-carriers that migrate into the formation.

3. The method of claim 1, wherein injecting nanoexplosive elements comprises:
   injecting the nanoexplosive elements using the device in the wellbore, the device comprising a pump configured to pump the nanoexplosive elements from a source thereof through a probe placed against a wall of the wellbore.

4. The method of claim 1, wherein injecting nanoexplosive elements comprises:
   (i) replacing a fluid in a section of the wellbore with a fluid containing nanoexplosive elements; and
   (ii) pressurizing the fluid containing the nanoexplosive elements in the section of the wellbore to cause the nanoexplosive elements to migrate into the formation.

5. The method of claim 1, wherein the one or more sensors include at least one sensor at a location selected from one of: (i) a location of a wellbore formed in the formation; (ii) a location at the surface; and (iii) at least one sensor in the wellbore formed in the formation and at least one sensor at the surface.

6. The method of claim 1, wherein the one or more sensors include at least three spaced apart sensor, and wherein processing the signals includes applying a triangulation technique to determine a location associate with the explosion of the nanoexplosive elements.

7. The method of claim 1, wherein the one or more sensors include at least three spaced apart sensor and wherein the processing the signals includes applying a triangulation technique to determine a location of the nanoexplosive elements after the nanoexplosive elements explode.

8. A method of estimating a property of a formation, comprising:
    drilling a wellbore using a drilling fluid;
    determining a condition of an invasion of the drilling fluid into the formation;
    conveying an apparatus into a wellbore, the apparatus carrying nanoexplosive elements;
    supplying nanoexplosive elements to the drilling fluid from the apparatus proximate a zone of interest in the formation;
    detonating the nanoexplosive elements, the nanoexplosive elements themselves being responsive to one of magnetic signals and radio signals to cause the detonating;
    detecting acoustic signals generated by explosion of the explosive elements in the zone of interest of the formation by one or more sensors; and
    processing the detected signals by a processor to determine location of a zone associated with the invasion of the drilling fluid into the formation.

9. An apparatus for use in a wellbore, comprising:
    an injection device in a tool configured to inject nanoexplosive elements into a formation while the tool is positioned in the wellbore proximate a zone of interest of the formation, wherein the nanoexplosive elements themselves detonate in response to one of magnetic signals and radio signals;
    one or more sensors configured to detect acoustic signals generated by explosion of the nanoexplosive elements in the formation; and
    a processor configured to process the signals from the one or more sensors to estimate a property of the formation.

10. The apparatus of claim 9, wherein the injection device includes a pump configured to pump the nanoexplosive elements from a source thereof in the tool into the formation.

11. The apparatus of claim 9, wherein the nanoexplosive elements are active elements and wherein the apparatus further comprises an actuation device to activate the active nanoexplosive elements.

12. The apparatus of claim 9, wherein the nanoexplosive elements comprise one of: (i) active elements configured to be exploded by a remote controller; and (ii) nanoexplosive elements carried by nano-carriers that migrate into the formation.

13. The apparatus of claim 9 further comprises:
    (i) a sealing device configured to isolate a section of the wellbore;
    (ii) a device configured to remove fluid from the isolated section; and wherein
    the injection device is configured to inject the nanoexplosive elements into the isolated space.

14. The apparatus of claim 9, wherein:
    (i) the one or more sensors include at least three spaced apart sensor;
    (ii) the processor is configured to utilize a triangulation technique to estimate a location of the explosion of the nanoexplosive elements in the formation.

15. An apparatus for estimating a property of a formation, comprising:
    a drill string configured for drilling a wellbore;
    a pump configured to supply a drilling fluid to the drill string during drilling of the wellbore;
    an apparatus configured to be conveyed into the wellbore, the apparatus carrying nanoexplosive elements and a device configured to inject the nanoexplosive elements into a formation surrounding the wellbore, wherein the nanoexplosive elements are configured to migrate into the formation and the nanoexplosive elements themselves detonate in response to one of magnetic signals and radio signals;
    at least one sensor configured to detect acoustic signals generated by the explosion of the nanoexplosive elements in the formation; and
    a processor configured to process the signals from the at least one sensor to estimate the property of the formation.

16. The apparatus of claim 15, wherein the explosive elements are active elements, and the apparatus further comprises a source to cause the active nanoexplosive elements to explode.

17. A method of fracturing a formation, comprising:
    injecting nanoexplosive elements into a formation at a selected location from a tool proximate the selected location; and
    controllably exploding the nanoexplosive elements injected into the formation to fracture the formation, the exploding comprising detonating nanoexplosive elements themselves in response to one of magnetic signals and radio signals.

* * * * *